United States Patent Office 3,298,176
Patented Jan. 17, 1967

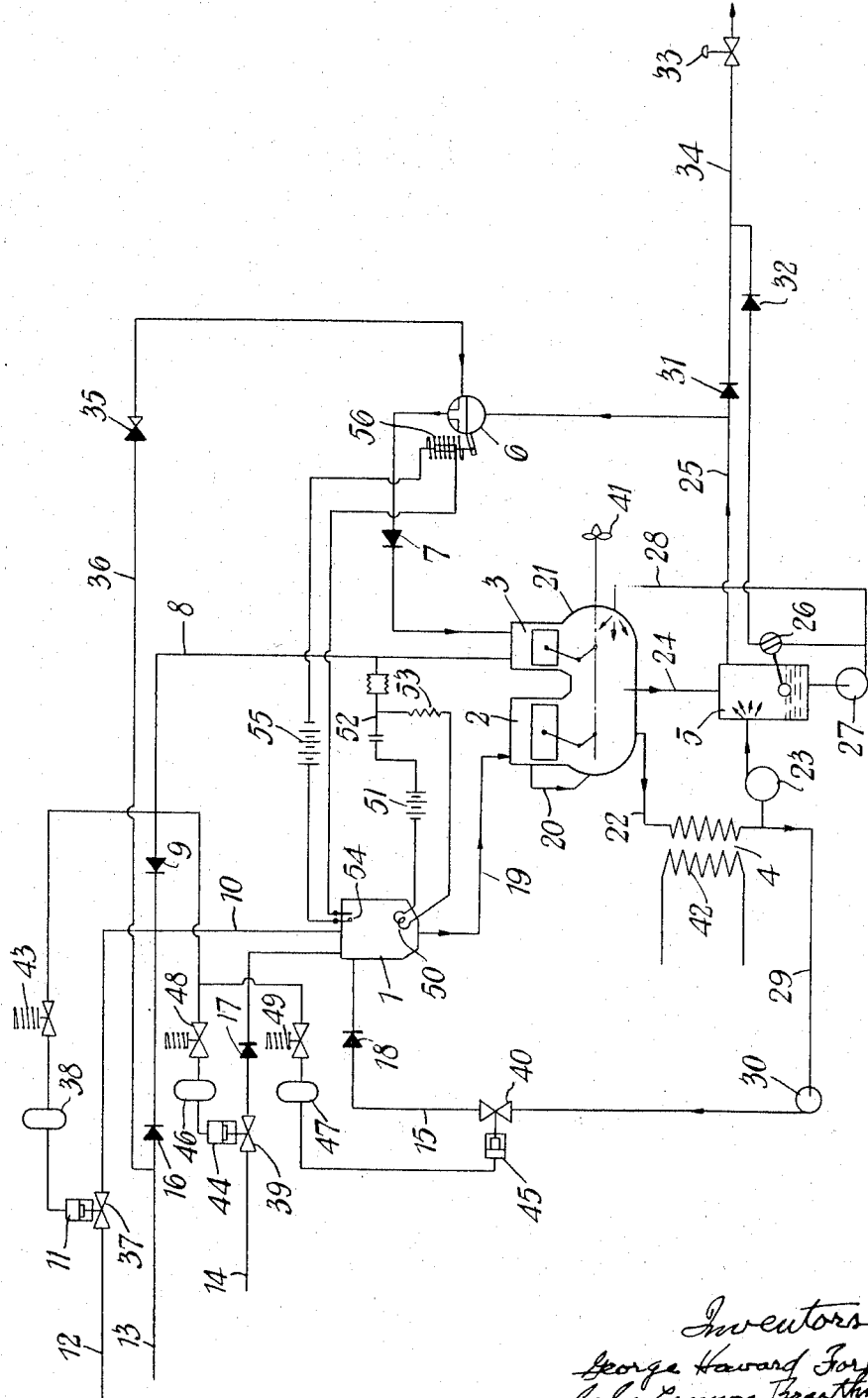

3,298,176
APPARATUS AND METHOD ADDING OXYGEN TO RE-CYCLE POWER PLANT EXHAUST GASES
George Howard Forsyth, Grange-over-Sands, John Cannon Braithwaite, Broughton-in-Furness, and Andrew Campbell Grant, Barrow-in-Furness, England, assignors to Vickers-Armstrongs (Engineers) Limited, London, England, a British company
Filed Mar. 4, 1965, Ser. No. 437,237
Claims priority, application Great Britain, Mar. 5, 1964, 9,448/64
16 Claims. (Cl. 60—39.02)

This invention relates to a power plant and a method of operating the same.

According to one aspect of the present invention, there is provided a method of operating a power plant, comprising burning fuel in a combustion chamber, supplying gases of combustion from said combustion chamber to an engine to drive the engine, recycling to the combustion chamber a part of the exhaust gases of the engine by means of a compressor, and mixing oxygen with said part before said part reaches said combustion chamber.

According to another aspect of the present invention, there is provided a power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, and oxygen supply means connected to said duct means at a location upstream of said combustion chamber for suppling oxygen to mix with said part before said part reaches said combustion chamber.

For better understanding of the invention one constructional form thereof will now be described in greater detail and by way of example with reference to the accompanying drawing. In the drawing, the single figure is a diagrammatic representation of a power plant intended for underwater operation, for example in a torpedo, and including a reciprocating engine.

The power plant illustrated includes a combustion chamber 1, the combustion gas outlet of which is connected by a pipe 19 to a reciprocating engine 2. A pipe 12 is connected to the combustion chamber 1 via an oxygen control valve 37 and a further pipe 10, the pipe 12 being connected by way of pressure reducing means (not shown) to a supply of oxygen stored in high pressure bottles (not shown). A pipe 14 has therein a fuel oil control valve 39, and, downstream of the valve 39, a non-return valve 17. The pipe 14 serves to feed fuel oil from a suitable supply (not shown) to one or more nozzles (not shown) provided within the combustion chamber 1. Two further pipes communicate with the combustion chamber 1, these further pipes being a cooling water supply pipe 15 having a non-return valve 18 and a water control valve 40 therein, and a pipe 13 which connects a supply (not shown) of inactive gas, for example carbon dioxide as in this case or nitrogen, to the pipe 10, and hence to the chamber 1, by way of a non-return valve 16.

The engine 2 operates on the Rankine cycle and the gaseous products of combustion entering the engine 2 from the pipe 19 expand and displace the piston of the engine 2 downwardly thereby to drive the propeller 41.

The products of combustion are then discharged from the cylinder of the engine 2 into the crank case 21 by way of a pipe 20. The crank case 21 acts as a first stage cooler for the products of combustion, a spray of water for cooling these products entering the crank case 21 from the pipe 28. The partly cooled gases are exhausted from the crank case 21 through a pipe 24 and enter a chamber 5 which acts as a second stage cooler. The cooled gases leave the chamber 5 by way of a pipe 25 and flow through a non-return valve 31, a pipe 34 and a discharge valve 33, and are discharged from the plant into the sea. The setting of the valve 33 is adjusted automatically in dependence on the depth beneath the sea at which the plant is operating, the adjustment being such as to ensure that the pressure in pipe 34 remains constant irrespective of the depth at which the plant is operating. By this means, the engine always operates between the same inlet and outlet conditions of pressure.

The hot water in the crank case 21 is withdrawn from the crank case through a pipe 22 and a heat exchanger 4. Sea water used as cooling fluid for the heat exchanger 4 flows through the cooling coil 42 of the exchanger. Some of the cooled water leaving the heat exchanger 4 is sprayed by a pump 23 into the chamber 5 and the remainder of the water is drawn through a pipe 29 by a pump 30 and sprayed into the combustion chamber 1 via the pipe 15 and the valves 18 and 40.

As will be seen from the drawing, the spray of water entering the chamber 5 from the pipe 22 is extracted from the chamber 5 by means of a pump 27.

The level of the water at the bottom of the chamber 5 is regulated by means of a float-operated valve 26, the valve 26 opening in the event that the level in the chamber 5 exceeds a predetermined level so that the pump 27 discharges water from the chamber 5 through a non-return valve 32, the pipe 34 and the valve 33.

The pipe 25 is connected via a two way valve 6 and a non-return valve 7 to the inlet of a compressor 3, the outlet of the compressor 3 being connected by way of a pipe 8 and a non-return valve 9 to the pipe 10. The two way valve 6 in one position thereof connects the exhaust gas inlet of the compressor 3 to the pipe 25 and in the other position thereof connects the pipe 13, and hence the supply of carbon dioxide, to the inlet of the compressor 3 by way of a pipe 36 and a pressure reducing valve 35.

In addition to its connection to the pipe 10, the outlet of the compressor 3 is also connected to a chamber 38 having an adjustably pre-set valve 43 at the inlet thereof, this valve 43 being arranged to open upon the pressure in the pipe 8 increasing above a certain value. Upon the valve 43 opening the pressure in the chamber 38 increases and, when the pressure in the chamber 38 reaches a certain value, a pressure-operated piston-and-cylinder device 11 is actuated to open the valve 37. The device 11 includes a spring-loaded piston to which the pressure of the chamber 38 is applied, the piston being connected to the valve 37. Similar pressure-operated valve opening devices 44 and 45 are provided, these devices being preceded by chambers 46 and 47 and adjustably pre-set valves 48 and 49 corresponding to the chamber 38 and the valve 43, and these devices serving to actuate the valves 39 and 40 to initiate the fuel supply via pipe 14 and supply of cooling water via pipe 15. Disposed in the chamber 1 is an ignition coil 50 electrically connected in series with a battery 51 and a pressure-operated switch 52 via a flexible conductor 53. The ignition coil may be replaced by a sparking plug if desired. The device 44 and 45 and the switch 52 are actuated by the pressure in the pipe 8, the switch 52 serving, while actuated, to connect the coil 50 to the battery 51.

A temperature-responsive bimetal switch 54 is disposed in the chamber 1 and is electrically connected in series with a battery 55 and a solenoid 56. The plunger of the solenoid 56 is mechanically connected to the movable valve member of the valve 6. By these means, the valve 6 is changed-over when the temperatures in the combustion chamber 1 rises above a pre-determined value.

The non-return valves 7, 9, 16, 17, 18, 31 and 32 are all spring-loaded.

The power plant illustrated operates in the following manner. To start up the plant, carbon dioxide is supplied to the chamber 1 and flows through the chamber 1 and along the pipe 19 into the engine 2 where it expands and does useful work. All the expanded carbon dioxide then passes through the pipe 20, the crank case 21, the pipe 24, the chamber 5, the pipes 25 and 34 and the valves 31 and 33, and is discharged. Carbon dioxide is also supplied via the pipe 36, the pressure reducing valve 35, the two way valve 6 and the non-return valve 7 to the compressor 3 and forms a low pressure supply therefor. The work done by carbon dioxide expanding in the engine 2 drives the compressor so that the pressure in the pipe 8 builds up and at a predetermined pressure the valve 9 opens allowing carbon dioxide to flow from the pipe 8 into the chamber 1. At a pressure somewhat above that at which the valve 9 opens the valve 43 opens and the pressure in the chamber 38 increases until it is sufficient to actuate the device 11 and open the valve 37 so that a mixture of carbon dioxide and oxygen is supplied to the combustion chamber 1. There is some delay after the valve 43 opens before the device 11 actuates the valve 37, owing to the slow-build-up of pressure in the chamber 38. The other pressure operated devices 44, 52 and 45 operate in turn so that fuel oil is supplied to the chamber 1 and ignited in the chamber, and water is subsequently supplied to the chamber.

Upon the products of combustion in the combustion chamber 1 reaching a pre-determined temperature, the two way valve 6 is actuated by the temperature-responsive switch 54 so that the supply of carbon dioxide to the compressor 3 is cut off and some of the exhaust gases in the pipe 25 are fed to the compressor 3, compressed and fed, mixed with oxygen, to the chamber 1. Also at this stage the supply of carbon dioxide to the chamber 1 discontinues. The carbon dioxide stored by the carbon dioxide supply is sufficient to drive the engine for long enough to cause the pressure at the compressor output to reach the required value. The pressure of the gases recycled by the compressor will then be sufficient to prevent further supply of carbon dioxide through the valve 16. However, it may be desirable to provide a pressure-operated cut-off valve arranged to close positively the pipe 13 when the pressure in the pipe 10 reaches a predetermined value. This cut-off valve may be arranged to be closed by a piston-and-cylinder device having its working chamber connected to the pipe 10.

The engine is now in its normal running condition and a mixture of oxygen and recycled products of combustion together with fuel oil and cooling water are fed continuously to the combustion chamber in which continuous combustion occurs.

As regards the ignition coil 50, this can either be switched off at the time when the carbon dioxide supply discontinues, or remain energized. For example, a bimetal strip sensitive to the temperature in the chamber 1 may be provided for switching off the ignition coil 50, or the ignition coil may be energized continuously by a generator driven by the engine 2.

In an alternative embodiment, the switch 54 could be associated with the pipe 19 instead of with the combustion chamber.

If unacceptable water coolant losses are anticipated, water under pressure may be fed into the pipe 15 to make up for any water losses. For example, water may be fed into the pipe 15 from an air loaded source and control of the inflow of water may be by way of valve 26 which would permit supply of water when the water in the chamber 5 fell below a certain level. In any case, sufficient water would be initially provided in the chamber 5 to enable the engine to be started without requiring additional water.

The method of operation described ensures that the neat oxygen never contacts the fuel oil, so that spontaneous combustion between the neat oxygen and the fuel oil never occurs.

We claim:
1. A method of operating a power plant, comprising burning fuel in a combustion chamber, supplying gases of combustion from said combustion chamber to an engine to drive the engine, recycling to the combustion chamber a part of the exhaust gases of the engine by means of a compressor, and mixing substantially pure oxygen with said part before said part reaches said combustion chamber.

2. A method of operating a power plant, comprising providing a compressed inactive gas which is inactive with a hydrocarbon, supplying said inactive gas to an engine via a combustion chamber to start driving said engine, driving a compressor from said engine, opening, by the driving of said compressor, valves controlling supply of hydrocarbon fuel and substantially pure oxygen to said combustion chamber, mixing said substantially pure oxygen and said inactive gas, supplying the mixture so formed to said combustion chamber, supplying said fuel to said combustion chamber, burning the fuel in said combustion chamber, supplying gases of combustion from said chamber to said engine to drive the engine, recycling to said chamber a part of the exhaust gases of said engine by means of said compressor, and mixing said oxygen with said part before said part reaches said combustion chamber.

3. A method of operating a power plant, comprising providing a compressed inactive gas which is inactive with a hydrocarbon, supplying said inactive gas to an engine via a combustion chamber to start driving said engine, driving a compressor from said engine, opening, by the driving of said compressor, valves controlling supply of hydrocarbon fuel and substantially pure oxygen to said combustion chamber, mixing said substantially pure oxygen and said inactive gas, supplying the mixture so formed to said combustion chamber, supplying said fuel to said combustion chamber, burning the fuel in said combustion chamber, supplying gases of combustion from said chamber to said engine to drive the engine, recycling to said chamber a part of the exhaust gases of said engine by means of said compressor, mixing said oxygen with said part before said part reaches said combustion chamber and ceasing to supply said inactive gas to said combustion chamber.

4. A method of operating a power plant for submarine use, comprising burning fuel in a combustion chamber, supplying gases of combustion from said combustion chamber to an engine to drive the engine, discharging into the sea a first part of the exhaust gases of the engine, recycling to the combustion chamber the remaining part of said exhaust gases by means of a compressor, mixing substantially pure oxygen with said remaining part before said remaining part reaches said combustion chamber, and maintaining substantially constant that pressure which said first part has shortly before discharge irrespective of the depth of immersion of the power plant in the sea.

5. A method of operating a power plant, comprising burning fuel in a combustion chamber, supplying gases of combustion from said combustion chamber to an engine to drive the engine, recycling to the combustion chamber a part of the exhaust gases of the engine by means of a compressor, mixing substantially pure oxygen with said part before said part reaches said combustion chamber, and supplying to said combustion chamber a coolant.

6. A method of operating a power plant, comprising burning fuel in a combustion chamber, supplying gases of combustion from said combustion chamber to an engine to drive the engine, recycling to the combustion chamber a part of the exhaust gases of the engine by means of a compressor, mixing substantially pure oxygen with said part before said part reaches said combustion chamber, supplying to said combustion chamber a liquid coolant which vapourises in said combustion chamber, passing said exhauts gases through a condenser to condense the vapourised coolant in said exhaust gases, and recycling such condensed coolant to said combustion chamber.

7. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, and oxygen supply means connected to said duct means at a location upstream of said combustion chamber for supplying substantially pure oxygen to mix with said part before said part reaches said combustion chamber.

8. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying substantially pure oxygen to mix with said part before said part reaches said combustion chamber, inactive gas supply means connected to said duct means at a location upstream of said combustion chamber for supplying a gas inactive with hydrocarbon fuel to said engine via said chamber to start driving said engine, a fuel control valve of said fuel supply means for opening to permit the supply of said fuel to said chamber, an oxygen control valve of said oxygen supply means for opening to permit the supply of said oxygen to said duct means, and control means connected to said compressor and to the fuel and oxygen control valves for opening said control valves following starting of said compressor by the starting of said engine.

9. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying oxygen to mix with said part before said part reaches said combustion chamber, inactive gas supply means connected to said duct means at a location upstream of said combustion chamber for supplying a gas inactive with hydrocarbon fuel to said engine via said chamber to start driving said engine, a fuel control valve of said fuel supply means for opening to permit the supply of said fuel to said chamber, an oxygen control valve of said oxygen supply means for opening to permit the supply of said oxygen to said duct means, branch duct means branching from the first-mentioned duct means downstream of said compressor, and pressure operated control means connected to the fuel and oxygen control valves, on the one hand, and to said branch duct means, on the other hand, for opening said control valves following starting of said compressor by the starting of said engine.

10. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying oxygen to mix with said part before said part reaches said combustion chamber, inactive gas supply means connected to said duct means at a location upstream of said combustion chamber for supplying a gas inactive with hydrocarbon fuel to said engine via said chamber to start driving said engine, a fuel control valve of said fuel supply means for opening to permit the supply of said fuel to said chamber, an oxygen control valve of said oxygen supply means for opening to permit the supply of said oxygen to said duct means, a first pressure-operated piston-and-cylinder device operatively connected to said fuel control valve for operation to open said fuel control valve, a second pressure-operated piston-and-cylinder device operatively connected to said oxygen control valve for operation to open said oxygen control valve, a first branch duct branching from said duct means downstream of said compressor and leading to the working chamber of the first piston-and-cylinder device, a first pressure-operated valve interposed in said branch duct and having its opening pressure adjustable for opening following starting of said compressor by the starting of said engine, a second branch duct branching from said duct means downstream of said compressor and leading to the working chamber of the second piston-and-cylinder device, and a second pressure-operated valve interposed in said branch duct and having its opening pressure adjustable for opening following starting of said compressor.

11. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying oxygen to mix with said part before said part reaches said combustion chamber, a first inactive gas supply pipe connected to said duct means at a first location upstream of said chamber and downstream of said compressor for supplying a gas inactive with hydrocarbon fuel to said engine via said chamber to start driving said engine, a fuel control valve of said fuel supply means for opening to permit the supply of said fuel to said chamber, an oxygen control valve of said oxygen supply means for opening to permit the supply of said oxygen to said duct means, control means connected to said compressor and to the fuel and oxygen control valves for opening said control valves following starting of said compressor by the starting of said engine, a second inactive gas supply pipe connected to said duct means at a second location upstream of said compressor and downstream of said engine for supplying the inactive gas to said compressor, an inactive gas control valve serving to control the supply of said inactive gas via said second inactive gas supply pipe, and a temperature-sensitive device influenced by the temperature in said combustion chamber and connected to said inactive gas control valve for closing the latter valve when the temperature in said chamber rises above a pre-determined value.

12. A power plant, comprising a combustion chamber, fuel supply means connected to said combustion chamber for supplying to said chamber a fuel to be burned therein, a combustion gas outlet of said chamber, an engine, a combustion gas inlet of said engine connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying oxygen to mix with said part before said part reaches said combustion chamber, a first inactive gas supply pipe connected to said duct means at a first location upstream of said chamber and downstream of said compressor for supplying a gas inactive with hydrocarbon fuel to said engine via said chamber to start driving said engine, a fuel control valve of said fuel supply means for opening to permit the supply of said fuel to said chamber, an oxygen control valve of said oxygen supply means for opening to permit the supply of said oxygen to said duct means, control means connected to said compressor and to the fuel and oxygen control valves for opening said control valves following starting of said compressor by the starting of said engine, a second inactive gas supply pipe connected to said duct means at a second location upstream of said compressor and downstream of said engine for supplying the inactive gas to said compressor, an upstream portion of said duct means upstream of said second location, a downstream portion of said duct means downstream of said second location, a change-over valve at said second location and operable to connect either said second inactive gas supply pipe to said downstream portion or said upstream portion to said downstream portion for changing-over from supply of the inactive gas to said compressor to supply of said part to said compressor, and a temperature-responsive device influenced by the temperature in said combustion chamber and connected to said change-over valve for closing the latter valve when the temperature in said combustion chamber rises above a predetermined value.

13. A power plant for submarine use, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying substantially pure oxygen to mix with said part before said part reaches said combustion chamber, a discharge pipe connected to said duct means and leading to the ambient atmosphere, and a depth-controlled discharge valve interposed in said discharge pipe for opening in dependence on the depth of immersion of said plant in the sea in such manner as to maintain substantially constant the pressure immediately upstream of said discharge valve irrespective of said depth.

14. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying substantially pure oxygen to mix wtih said part before said part reaches said combustion chamber, and coolant supply means connected to said chamber for supplying a coolant thereto.

15. A power plant, comprising a combustion chamber fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying substantially pure oxygen to mix with said part before said part reaches said combustion chamber, a coolant supply means connected to said chamber for supplying a liquid coolant to said chamber which coolant vapourises therein, and condenser and pump means connected downstream of said exhaust gas outlet and connected to said coolant supply means for condensing the vapourised coolant in said exhaust gases and recycling the condensed coolant to said chamber.

16. A power plant, comprising a combustion chamber, fuel supply means connected to said combustion chamber for supplying to said chamber a fuel to be burned therein, a combustion gas outlet of said chamber, an engine, a combustion gas inlet of said engine, connecting means connecting said combustion gas outlet to said combustion gas inlet for supplying gases of combustion from said chamber to said engine to drive said engine, an exhaust gas outlet of said engine, a compressor for compressing exhaust gases of said engine, an exhaust gas inlet of said combustion chamber, duct means connecting said exhaust gas outlet to said exhaust gas inlet via said compressor for recycling a part of the exhaust gases of said engine to said combustion chamber, oxygen supply means connected to said duct means at a location upstream of said combustion chamber for supplying substantially pure oxygen to mix with said part before said part reaches said combustion chamber, a pressure-operated, ignition control device connected to said duct means at a location downstream of said compressor for operation when the pressure in said duct means rises above a pre-determined value, and an ignition device disposed in said chamber and connected to said ignition control device for operation thereby to ignite said fuel in said chamber.

References Cited by the Examiner

UNITED STATES PATENTS

| | | | |
|---|---|---|---|
| 883,240 | 3/1908 | Sabthe. | |
| 2,441,751 | 5/1948 | Broggi | 60—39.52 X |
| 2,976,682 | 3/1961 | Erickson | 60—39.14 |
| 3,125,855 | 3/1964 | Kofink | 60—39.52 |
| 3,148,508 | 9/1964 | Karing | 60—64 |

MARK NEWMAN, *Primary Examiner.*

RALPH D. BLAKESLEE, *Examiner.*